United States Patent Office 3,047,545
Patented July 31, 1962

3,047,545
POLYMERS OF POLYFLUOROTHIOALDEHYDES
John Ferguson Harris, Jr., Wilmington, Del., assignor to
E. I. du Pont de Nemours and Company, Wilmington,
Del., a corporation of Delaware
No Drawing. Filed June 19, 1959, Ser. No. 821,378
13 Claims. (Cl. 260—79)

This invention relates to a new class of thiocarbonyl compounds. More particularly, it relates to new monomeric thiocarbonyl compounds and their polymers containing fluorine and to a method for their preparation.

Many types of polymers are known and a considerable number of them are being used commercially in the form of films, fibers, plastics, elastomers, molding compositions, adhesives, laminating agents, and the like. These known polymers have valuable properties that result from particular chemical structures and molecular weights and these particular properties make them especially useful in specific applications. It is therefore a desirable goal to provide compounds having new chemical structures that form polymers which possess useful properties.

The products of this invention comprise a new class of thiocarbonyl compounds and their polymers. These novel products are polyfluorothioaldehydes, and their polymers. The polymers include homopolymers and copolymers of polyfluorothioaldehydes with at least one other copolymerizable monomer. The prefix "poly" as used herein in "polyfluorothioaldehyde" refers to the number of fluorine atoms in the molecule and means that the monomeric fluorothioaldehyde contains more than one fluorine atom. A preferred group of the compounds of this invention are those monomers having the formula $$X(CF_2)_nCH$$
$$\parallel$$
$$S$$

and their polymers having recurring structural units of the formula $$\begin{array}{c}(CF_2)_nX\\|\\-C-S-\\|\\H\end{array}$$

where X represents hydrogen or fluorine and $n$ represents a whole number, preferably between 1 and 8, inclusive.

The monomeric polyfluorothioaldehydes are purple in color and polymerize rapidly even at extremely low temperatures. Solutions of monomeric polyfluorothioaldehydes retain their purple color at temperatures below about —80° C. for a few hours.

The polymers of this invention vary from viscous oils to solids, some of which possess elastic properties. They are generally soluble in ethers, e.g., diethyl ether and in ketones, e.g., acetone. They are insoluble in water and hydrocarbons.

These novel compounds are prepared by processes which involve removal of HY from polyfluorinated thiols of the formula

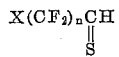

wherein X and $n$ have the same meanings as in the formula for the recurring units in the polymers, and Y is fluorine, hydroxyl or thiol. The course of this reaction is illustrated schematically as follows:

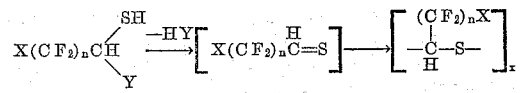

where $x$ is a positive integer greater than 1.

A preferred method for preparing the compounds of this invention comprises heating a compound of the formula

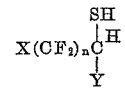

to a temperature between 100° and 700° C. and the reaction products are collected in a receiver cooled to a temperature below the boiling point of the volatile products obtained, e.g., in a trap cooled by a mixture of solid carbon dioxide and acetone, or by liquid nitrogen.

The particular temperature at which the fluorinated thiol is thermally decomposed depends on the particular Y substituent in the starting material. When Y is fluorine a reaction temperature of 100°–500° C. can be used, but a temperature between 200° and 450° C. is preferred. When the Y substituent is hydroxyl or thiol, reaction temepratures between 350° and 700° C. can be used, but preferably a temperature of 400°–625° C. is employed.

The pressure under which this thermal decomposition process is carried out is not critical; however, it is preferred to use subatmospheric pressures. Pressures ranging from 1 to 10 mm. of mercury are especially suitable since they provide short contact times of the fluorinated thiol reactant and fluorinated thioaldehyde product in the hot reaction zone.

The reaction product collected in the cold trap following thermal decomposition contains a purple colored material which gradually decolorizes. This indicates that the monomeric polyfluorothioaldehyde (purple color) first formed spontaneously polymerizes even at the low temperatures of the cold receiver. The product isolated from the receiver after warming to ordinary temperatures (e.g., 20°–30° C.) is polymeric polyfluorothioaldehyde.

The polyfluorothioaldehydes and their polymers can also be prepared by dehydrofluorination of fluorinated thiols having more than two fluorine atoms and having both fluorine and hydrogen on the carbon to which the thiol group is attached, i.e., fluorinated thiols of the general formula given previously with Y being fluorine, by means of an alkali metal fluoride. The monomeric polyfluorothioaldehyde formed on dehydrofluorination polymerizes spontaneously at ordinary temperatures to the polymers of this invention. In this dehydrofluorination method the fluorinated thiol having both hydrogen and fluorine on the carbon to which the thiol group is attached is contacted with at least one molar equivalent of an alkali metal fluoride whereby one mole of hydrogen fluoride is removed from each mole of the fluorinated thiol and absorbed by the alkali metal fluoride. In this method of dehydrofluorination, any alkali metal fluoride that forms acid fluorides, e.g., NaF·HF, or KF·HF, can be used. The alkali metal fluoride is used in amounts of at least one mole per mole of the fluorinated thiol reactant. Usually it is preferable to use a large excess of the alkali metal fluoride, e.g., up to a 10-fold excess, in order to provide a larger surface for reaction with the fluorinated thiol. The physical form of the alkali metal fluorides is not critical. Alkali metal fluorides in the form of granules, pellets, or coarse powder can be used.

The reaction temperature is not critical since the dehydrofluorination of the fluorinated thiol by the alkali metal fluoride takes place to some extent at least even at low temperatures such as —25° C. or even lower. However, the reaction proceeds faster at temperatures above 0° C. and preferably a temperature between 15 and 75° C. is employed.

The reaction pressure is likewise not critical, any pressure from subatmospheric to superatmospheric being operable. When operating at atmospheric pressure or reduced pressure, a stream of a carrier gas, e.g., nitrogen, is a convenient method for passing the fluorinated thiol through the reaction vessel containing the alkali metal fluoride. Subatmospheric pressures are especially suitable when higher boiling fluorinated thiols are employed as a reactant or when it is desired to pass the fluorinated thiol rapidly through the reaction zone.

Volatile products leaving the reaction zone are collected in traps cooled to a low temperature, e.g., by mixtures of solid carbon dioxide and acetone or by liquid nitrogen. Any polyfluorothioaldehyde that polymerizes on the solid alkali metal fluoride in the reaction vessel can be isolated by extraction of the alkali metal fluoride particles with a solvent for the polymer, e.g., diethyl ether, followed by evaporation or distillation of the solvent from the polymer.

Any fluorinated thiol that passes through the reaction zone unchanged can be isolated in the cold trap and recycled through the alkali metal fluoride if desired. Thus, a continuous or a semi-continuous operation can be carried out by separating unreacted fluorinated thiol from reaction products and recycling it over the alkali metal fluoride.

The products and the process of this invention are illustrated in further detail by the following examples in which the proportions of ingredients are expressed in parts by weight unless otherwise stated.

*Example I*

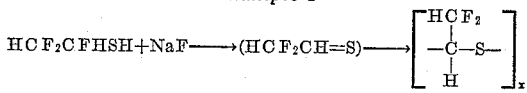

Eight and five-tenths parts of 1,2,2-trifluoroethanethiol (prepared by the X-ray initiated addition of hydrogen sulfide to trifluoroethylene) is placed in a vessel equipped with a capillary nitrogen inlet tube extending to the bottom of the vessel. The top of the vessel is connected to one end of a glass reaction tube $^{11}/_{16}''$ in diameter and 1' long packed with sodium fluoride pellets. The other end of the glass tube is connected to a vacuum pump through two traps cooled by a mixture of acetone and solid carbon dioxide. A slow stream of nitrogen is passed through the capillary tube and the system is evacuated to about 170 mm. of mercury pressure. A period of about 0.5 hour is required to completely volatilize the thiol. There is obtained in the first trap one part of liquid which is primarily unreacted 1,2,2-trifluoroethanethiol (based on nuclear magnetic resonance spectroscopy). The column packing is extracted twice with 200 parts of diethyl ether and the resulting combined extract is filtered and then evaporated to dryness. There is obtained 3.2 parts of a semi-solid polymer of difluorothioacetaldehyde.

*Analysis.*—Calc'd for $(C_2H_2F_2S)_x$: C, 25.0%; H, 2.2%; F, 39.5%; S, 33.3%. Found: C, 24.3%; H, 2.3%; F, 39.5%; S, 32.6%.

*Example II*

The process of Example I is repeated except that a reactor with a cooling jacket containing cold water is employed. From 5.0 parts of 1,2,2-trifluoroethanethiol, there is obtained 2.73 parts (54%) of a semi-solid polymer of difluorothioacetaldehyde.

*Analysis.*—Calc'd for $(C_2H_2F_2S)_x$: F, 39.5%. Found: F, 40.1%.

The fluorine nuclear magnetic resonance pattern of an ether solution of this polymer indicates one resonance which is a doublet. This is consistent with the structure intended for a polymer of difluorothioacetaldehyde.

*Example III*

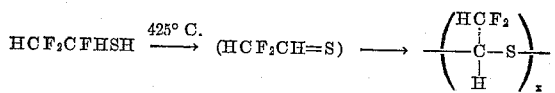

Over a period of 15 minutes 3 parts of 1,2,2-trifluoroethanethiol is passed through a tube packed with small pieces of glass tubing and heated to 425° C. The reaction tube is connected to two liquid nitrogen-cooled traps and the whole system is evacuated by an oil pump to a pressure of 1–2 mm. of mercury. When the reaction is completed, only the first trap contains any material. This material consists of white, solid polymeric difluorothioacetaldehyde and purple monomeric difluorothioacetaldehyde. As the trap is allowed to warm to room temperature (still under oil pump vacuum), the purple color disappears and the polymer degasses somewhat. At room temperature, the polymer exhibits considerable elasticity. It is purified by dissolving in diethyl ether and precipitating with pentane. After drying in vacuum (1–2 mm. Hg at 20°–25° C.), there is obtained 0.75 part of a solid polymer of difluorothioacetaldehyde.

*Example IV*

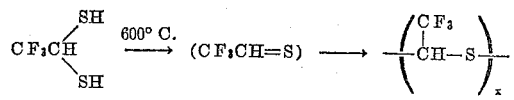

Over a period of 10 minutes, two parts of 2,2,2-trifluoroethane-1,1-dithiol (prepared by treating trifluoroacetaldehyde with phosphorus pentoxide and hydrogen sulfide at room temperature under autogenous pressure) is passed through a tube packed with small pieces of glass tubing heated to 600° C. The reaction tube is connected to two traps, the first one cooled with an acetone-solid carbon dioxide mixture and the second one cooled by liquid nitrogen, and the whole system is evacuated by an oil pump to a pressure of 1–2 mm. mercury. When the reaction is completed, only the second trap contains any material. This consists of a mixture of a purple solid material and a white solid material. As the mixture continues to be maintained at the temperature of liquid nitrogen, the purple color (which is due to monomeric trifluorothioacetaldehyde) gradually fades and the whole mass is a white solid. At room temperature, this polymer of trifluorothioacetaldehyde (1.25 parts) is tough and considerably elastic. It is purified by rinsing twice in chloroform and dried in a vacuum oven at 50° C.

*Analysis.*—Calc'd for $(C_2HSF_3)_x$: S, 28.1%; F, 50.0%. Found: S, 27.5%; F, 49.79%.

This polymer is swelled by chloroform and is slightly soluble in this solvent. It is soluble in tetrahydrofuran and can be cast into films from that solvent. Elastic filaments of the polymer can be prepared by inserting a rod into a concentrated tetrahydrofuran solution of the polymer, withdrawing the rod, and allowing the withdrawn filament to air-dry. These filaments can be woven into fabrics having elastic properties.

This polymer of trifluorothioacetaldehyde can also be pressed at 100° C. and 15,000 lbs. ram pressure during 1 minute into clear, elastic films.

*Example V*

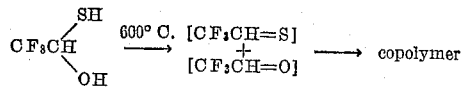

Over a period of 15 minutes, two parts of 2,2,2-trifluoroethane-1,1-olthiol (prepared by treating trifluoroacetaldehyde with hydrogen sulfide at room temperature under autogenous pressure) is passed through a tube packed with small pieces of glass tubing in the same manner as described in Example IV. The product contained in the liquid nitrogen-cooled trap consists of a mixture of white and purple solids. Again, the purple color resulting from the presence of monomeric trifluorothioacetaldehyde slowly fades and the whole mass becomes white. At room temperature the product is a white, somewhat elastic polymer wet with water. The sample after drying in a vacuum oven (1–2 mm. Hg at 20°–25° C.) amounts to 1.0 part. This sample is rinsed once with chloroform and dried again in a vacuum oven (1–2 mm. Hg at 25° C.). Analysis indicates that this polymer is a copolymer consisting of 82 parts of combined trifluorothioacetaldehyde and 18 parts of combined trifluoroacetaldehyde.

*Analysis.*—Calc'd for $(C_2HSF_3)_{0.82}(C_2HOF_3)_{0.18}$: S, 23.1%; F, 51.5%. Found: S, 23.0%; F, 50.89%.

This copolymer of trifluorothioacetaldehyde and trifluoroacetaldehyde is pressed to opaque elastic films at 75° C. and 15,000 lbs. ram pressure during 0.5 minute.

*Example VI*

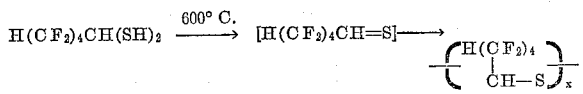

Two and eight-tenths parts of 1,5-dihydrooctafluoropentane-1,1-dithiol (prepared by the treatment of omega-hydrooctafluorovaleraldehyde with hydrogen sulfide and phosphorus pentoxide in a pressure vessel at room temperature) is pyrolyzed at 600° C. as described in Example IV. The material which deposits in the traps is allowed to warm to room temperature, is rinsed several times with chloroform (by which it is swelled), and is then dried in a vacuum oven (1–2 mm. Hg) for 18 hours at room temperature. There is obtained 1.13 parts of solid polymer of omega-hydrooctafluorothiovaleraldehyde which could be pressed into a hard, opaque film at 75° C., 15,000 lbs. ram pressure for 0.5 minute.

*Analysis.*—Calc'd for $(C_5H_2F_8S)_x$: S, 13.0%; F, 61.7%. Found: S, 14.2%; F, 60.33%.

*Example VII*

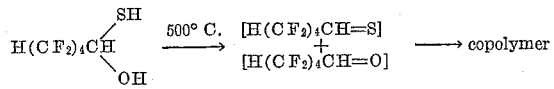

Five and one-tenth parts of 1,5-dihydrooctafluoropentane-1,1-olthiol (prepared by treating octafluorovaleraldehyde with hydrogen sulfide at room temperature under autogenous pressure) is pyrolyzed at 500° C. as described in Example IV. The polymer is rinsed in chloroform and dried in a vacuum oven (1–2 mm. Hg) for 18 hours at room temperature. There is obtained 1.19 parts of a solid, almost white copolymer of omega-hydrooctafluorothiovaleraldehyde and omega-hydrooctafluorovaleraldehyde, which can be pressed into clear, flexible films at 75° C., 15,000 lbs. ram pressure for 1 minute. The analysis indicates this material to contain 84% of the thioaldehyde and 16% of the aldehyde.

*Analysis.*—
Calc'd for $[H(CF_2)_4CH=S]_{0.84}[H(CF_2)_4CH=O]_{0.16}$: S, 10.9%; F, 62.4%. Found: S, 10.9%; F, 60.92%.

In addition to the specific polyfluorothioaldehyde monomers and polymers illustrated by the examples, the products of this invention include monomers of other polyfluorothioaldehydes having the formula

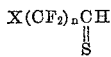

and their polymers having recurring structural units of the following formula:

(X and *n* have the meanings previously specified.) Specific illustrations of other monomers and polymers of these types include pentafluorothiopropionaldehyde, 3-hydrotetrafluorothiopropionaldehyde, heptafluorothiobutyraldehyde, nonafluorothiocaproaldehyde, perfluorothioheptaldehyde, omega-hydroperfluorothiononaldehyde and perfluorothiononaldehyde, and their polymers. Also, included are copolymers of these polyfluorothioaldehydes with other copolymerizable monomers. Examples of such copolymerizable monomers include fluorocarbonyl and fluorothiocarbonyl compounds, e.g., difluoroacetaldehyde, pentafluoropropionaldehyde perfluorononaldehyde, thiocarbonyl difluoride, thiocarbonyl chlorofluoride, trifluorothioacetyl fluoride, and perfluorothioacetone.

The monomers of this invention are especially useful for forming polymers, including both homopolymers and copolymers, which are useful in various applications. The polymers that are viscous oils are especially useful as lubricants. The polymers that are semi-solid and tacky are useful as adhesives, as are also the solid polymers. By way of illustration, a solution of the difluorothioacetaldehyde polymer of Example III in ether is prepared and is allowed to evaporate until it becomes sticky. It is then applied to a strip of stainless steel and a piece of white cardboard is clamped on the treated portion of the stainless steel. The clamped assembly is then warmed in a vacuum oven (1–2 mm. Hg at 60° C.) overnight. The next day the assembly is allowed to cool and the clamp is removed. An examination indicates that the cardboard is firmly attached to the stainless steel. An attempt to pull off the cardboard results in tearing and leaving of a layer of cardboard still attached to the stainless steel surface by virtue of the adhesive. The adhesive bond is stronger than the cardboard itself.

In another test, two polytetrafluoroethylene chips are clamped together with a layer of difluorothioacetaldehyde polymer between them and the whole assembly is heated in a vacuum oven overnight at 60° C. (1–2 mm. Hg). After cooling, examination reveals that a bond of moderate strength exists between the two chips by virtue of the intervening adhesive. Considerable force is needed to separate the chips from one another.

Solid polymers and copolymers of polyfluorothioaldehydes can be formed into films by solvent casting and hot-pressing methods, and the resulting films can be used in those applications where self-supporting films and sheets are ordinarily used.

The solutions of the polymers and copolymers of polyfluorothioaldehydes are also useful as coating compositions for applying layers of these polymers on various substrates, e.g., wood, metal, glass, etc.

I claim:

1. A copolymer of a polyfluorothioaldehyde of the formula

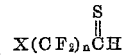

wherein X is a member selected from the class consisting of hydrogen and fluorine and *n* is 1–8 and at least one other copolymerizable monomer.

2. A process which comprises the heating to a temperature of from 100° to 700° C. a compound of the general formula

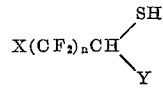

whereby HY is eliminated and recovering a polyfluorothioaldehyde polymer having a plurality of recurring units of general formula

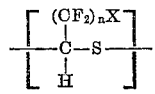

whereinabove X is a radical selected from the group consisting of H and F, Y is a radical selected from the group consisting of F, OH, and SH and *n* is a whole number.

3. Process according to claim 2 wherein *n* is in the range of one to eight inclusive.

4. Polyfluorothioaldehydes of the formula

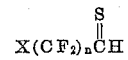

wherein X is a member of the class consisting of hydrogen and fluorine and $n$ is 1–8.

5. A homopolymer consisting of a plurality of recurring structural units of the formula

wherein X is a member of the class consisting of hydrogen and fluorine and $n$ is 1–8.

6. Product of claim 1 in the form of self-supporting films.

7. Polymer of difluorothioacetaldehyde.

8. Polymer of trifluorothioacetaldehyde.

9. Copolymer of trifluorothioacetaldehyde and trifluoroacetaldehyde.

10. Polymer of ω-hydrooctafluorothiovaleraldehyde.

11. Copolymer of ω-hydrooctafluorothiovaleraldehyde and ω-hydrooctafluorovaleraldehyde.

12. Product of claim 5 in the form of a self-supporting film.

13. Copolymers of claim 1 in which said other copolymerizable monomer is selected from the class consisting of fluorocarbonyl and fluorothiocarbonyl compounds.

References Cited in the file of this patent

UNITED STATES PATENTS

| 1,991,765 | Marks | Feb. 19, 1935 |
| 2,568,500 | Husted e al. | Sept. 18, 1951 |

FOREIGN PATENTS

| 480,360 | Canada | Jan. 22, 1952 |